United States Patent
Efstathiou et al.

(10) Patent No.: US 11,494,689 B2
(45) Date of Patent: Nov. 8, 2022

(54) METHOD AND DEVICE FOR IMPROVED CLASSIFICATION

(71) Applicant: Chatterbox Labs Limited, Reading (GB)

(72) Inventors: Ioannis Efstathiou, Reading (GB); Stuart Battersby, Reading (GB); Henrique Nunes, Reading (GB); Zheng Yuan, Reading (GB)

(73) Assignee: Chatterbox Labs Limited, Reading (GB)

( * ) Notice: Subject to any disclaimer, the term of this patent is extended or adjusted under 35 U.S.C. 154(b) by 1192 days.

(21) Appl. No.: 16/000,311

(22) Filed: Jun. 5, 2018

(65) Prior Publication Data

US 2019/0370219 A1    Dec. 5, 2019

(51) Int. Cl.
*G06N 20/00*    (2019.01)
*G06V 10/774*    (2022.01)
(Continued)

(52) U.S. Cl.
CPC ............. *G06N 20/00* (2019.01); *G06K 9/628* (2013.01); *G06K 9/6297* (2013.01); *G06V 10/7753* (2022.01); *G06V 20/41* (2022.01)

(58) Field of Classification Search
CPC .......... G06N 20/00; G06N 3/08; G06N 3/088; G06N 5/025; G06N 7/005; G06N 20/20; G06N 3/084; G06N 3/0472; G06K 9/6267; G06K 9/6256; G06K 9/6218; G06K 9/628; G06K 9/6277; G06T 2207/20084; G06T 2207/20081; G06F 16/353; G06F 40/216; G06F 40/284; G06F 40/30; G06F 16/35; G06F 16/355; G06F 16/55; G06V 10/82; G06V 10/70; G06V 10/764; G06V 20/698; G06V 10/7753; G06V 10/778;
(Continued)

(56) References Cited

U.S. PATENT DOCUMENTS

| | | | |
|---|---|---|---|
| 10,417,350 B1 * | 9/2019 | Mohamed | G06N 20/00 |
| 2014/0052674 A1 * | 2/2014 | Aggarwal | G06N 20/00 706/12 |
| 2017/0116544 A1 * | 4/2017 | Johnson | G06N 20/00 |

FOREIGN PATENT DOCUMENTS

JP    2006293767 A    * 10/2006

OTHER PUBLICATIONS

Wu et al., Reinforced Co-Training, Apr. 17, 2018 [retrieved Nov. 15, 2021], Cornell University: arXiv[archive], 11 pages. Retrieved: https://arxiv.org/abs/1804.06035 (Year: 2018).*

(Continued)

*Primary Examiner* — Matthew C Bella
*Assistant Examiner* — Dennis Rosario
(74) *Attorney, Agent, or Firm* — Marshall, Gerstein & Borun LLP

(57) ABSTRACT

There is provided systems and methods for training a classifier. The method comprises: obtaining a classifier for classifying data into one of a plurality of classes; retrieving training data comprising a set of observations and a set of corresponding labels, each label representing an assigned class for a corresponding observation; and applying an agent trained by a reinforcement learning system to generate labeled data from unlabeled observations and train the classifier using the training data and the labeled data according to a policy determined by the reinforcement learning system.

12 Claims, 10 Drawing Sheets

(51) Int. Cl.
*G06V 20/40* (2022.01)
*G06K 9/62* (2022.01)

(58) Field of Classification Search
CPC .. G06V 10/7784; G06V 20/35; G06V 40/172; G06V 20/41; G16B 40/20; G16B 40/30
See application file for complete search history.

(56) References Cited

OTHER PUBLICATIONS

Foerster et al., Learning to Communicate with Deep Multi-Agent Reinforcement Learning, May 24, 2016 [retrieved Nov. 15, 2021], Cornell Universify:arXiv [archive], 13 pages. Retrieved: https://arxiv.org/abs/1605.06676 (Year: 2016).*
Mariano et al., A New Distributed Reinforcement Learning Algorithm for Multiple Objective Optimization Problems, Nov. 19-22, 2000 [retrieved Nov. 15, 2021], Advances in Artificial Intelligence, vol.: Lecture Notes in Artificial Intelligence 1952, 10 pgs. Retrieved: DOI https://doi.org/10.1007/3-540-44399 (Year: 2000).*
Machine translation via SEARCH of JP 2006-292767 A, 23 pages (Year: 2022).*

* cited by examiner

METHOD AND DEVICE FOR IMPROVED CLASSIFICATION

TECHNICAL FIELD

The present disclosure relates to computer-implemented methods and systems for training classifiers.

BACKGROUND

This specification relates to reinforcement learning for classifiers.

Interaction with the environment and learning are concepts which are naturally connected with each other. The human being interacts with the world from a very early stage, developing an understanding of the cause and effects of its own actions. Hence it learns to plan in such ways that provide it with desired results. This information, which is maintained in the form of knowledge, is carried over to later stages of its lifespan. The human being therefore becomes capable of utilizing miscellaneous plans (i.e. policies) in order to act efficiently in various circumstances (i.e. states).

The environment provides positive or negative rewards to a person's behavior, just like a teacher, depending on their actions. Reinforcement learning is a particular area of Machine Learning that utilizes that idea: an agent traverses through a series of different states and actions in order to eventually locate the optimal policy. This policy dictates the most efficient (reward-wise) way of reaching its goal. It is a goal-oriented learning process, built upon mathematical analysis, and based on interaction with an uncertain environment. An (intelligent) agent is the autonomous entity (i.e. software) that has the capacity to learn via a computational approach.

Accordingly, in a reinforcement learning system, an agent interacts with an environment by performing actions in response to observations describing the current state of the environment. The responses of the agent to the observations are dictated by policies. The reinforcement system can be trained to learn improved responses by updating the policies based on a reward or cost function that provides feedback in response to the actions performed by the agent. Actions that move the agent towards a goal are rewarded, while actions that move the agent away from the goal are discouraged.

Classifiers classify data by applying labels to the data. This is useful in many fields, including image classification (e.g. for search engines), language classification (e.g. for artificial conversation entities), or data analysis (e.g. for classifying medical records). Reinforcement learning can be applied to classifiers. Having said this, training classifiers can be difficult. To effectively train classifiers, large pre-labeled data sets are usually required. Manually labeling data sets can be difficult and expensive. It can also be difficult to obtain the large amount of data needed to effectively train the classifier.

Accordingly, there is a need for improved methods of training classifiers that are more efficient and can function with smaller training datasets.

SUMMARY

According to an aspect of the invention there is provided a computer-implemented method for training a classifier, the method comprising: obtaining a classifier for classifying data into one of a plurality of classes; retrieving training data comprising a set of observations and a set of corresponding labels, each label representing an assigned class for a corresponding observation; and applying an agent trained by a reinforcement learning system to generate labeled data from unlabeled observations and train the classifier using the training data and the labeled data according to a policy determined by the reinforcement learning system.

The methods described herein utilize an agent trained via reinforcement learning to generate new instances of labeled data to help train a classifier to classify data more effectively. The agent can perform a number of actions, each action including labeled unlabeled data and retraining the classifier using the newly labeled data. Accordingly, the agent can progressively improve the performance of the classifier. This allows the classifier to be trained more effectively on fewer instances of input labeled data.

In one embodiment the agent performs a series of actions based on a state of the classifier, each action being determined in accordance with the policy, wherein the state of the classifier represents a level of classification performance of the classifier and each action comprises: generating labeled data from unlabeled observations; training the classifier based on the labeled data and the training data; and determining an updated state of the classifier, the updated state representing an updated level of classification performance of the classifier following the training.

In one embodiment the policy comprises a set of state action pairs, each state representing a level of classification performance of the classifier and each action comprising: generating labeled data from unlabeled observations; training the classifier based on the labeled data and the training data; and determining an updated state of the classifier, the updated state representing an updated level of classification performance of the classifier following the training.

Level of classification performance may be indicated by one or more of accuracy, recall, precision and f-score. This classification performance may be determined relative to input labeled data. This input labeled data may be the same as the training data, may be a subset of the training data, or may be a separate set of data that is held back for validating performance.

Each action may comprise training the classifier using a supervised learning process based on the newly labeled data and the training data. Each action may add the newly labeled data to a combined set of labeled data to continually build the labeled data within the combined set.

According to an embodiment the method comprises, prior to applying the agent: applying the classifier to the observations from the training data to classify the observations; and determining a state of the classifier, the state representing the classification performance of the classifier. Applying the agent comprises iteratively: determining from the policy the action that corresponds to the state of the classifier; performing the action to generate the updated state; and setting the state to equal the updated state, until an end condition is reached.

The end condition may be a maximum number of iterations or may be a goal state (e.g. a desired level of performance).

According to one embodiment, for at least one action, generating labeled data from unlabeled observations comprises: applying the classifier to classify the unlabeled observations; and for each unlabeled observation that has been classified with a confidence score that exceeds a confidence threshold, assigning a label to the unlabeled observation according to the classification.

Accordingly, the embodiment assigns labels to unlabeled data provided that the classifier can classify the data to a sufficient level of confidence. This newly labeled data can then be used to train the classifier.

According to an embodiment, for at least one action, generating labeled data from unlabeled observations comprises: dividing each of the observations from the training data into samples; determining the frequency of each sample within the training data; determining, for each sample and for each class, an inclusion probability for the sample within the class; selecting each sample that has an inclusion probability for a class that exceeds an inclusion probability threshold and assigning a label to that sample according to the class; identifying instances of each sample within the unlabeled observations; and generating labeled data from each identified instance by forming an observation comprising the identified instance and neighboring data that is located next to the identified instance within the unlabeled data and assigning the label corresponding to the sample for that instance to the newly formed observation.

Accordingly, this embodiment is able to generate new instances of data by sampling unlabeled data. By making use of inclusion probability, each sample can be chosen such that it is sufficiently representative of a given class. This not only adds new instances of labeled data for training the classifier, but provides improved quality training data (data that is more indicative of its respective class).

According to an embodiment the classifier is one of a plurality of classifiers of an overall classification system and the method comprises, for each classifier, applying a corresponding agent trained by the reinforcement learning system to generate labeled data from unlabeled observations and train the classifier using the training data and the labeled data according to the policy, wherein the policy is shared across the plurality of agents.

By applying multiple agents, one for each classifier, a multi-classification system can be trained more accurately and efficiently. Sharing the policy between the agents allows the system to be trained more quickly as each agent may make use of the information learned by the agents come before it.

According to an embodiment each agent performs a series of actions based on a state of the respective classifier, each action being determined in accordance with the policy, wherein the state of the respective classifier represents a level of classification performance of the respective classifier and each action comprises: generating labeled data from unlabeled observations; training the respective classifier based on the labeled data and the training data; and determining an updated state of the respective classifier, the updated state representing an updated level of classification performance of the respective classifier following the training.

According to an embodiment the policy comprises, for each classifier, a series of state action pairs, each state representing a level of classification performance of the respective classifier and each action comprising: generating labeled data from unlabeled observations; training the respective classifier based on the labeled data and the training data; and determining an updated state of the respective classifier, the updated state representing an updated level of classification performance of the respective classifier following the training.

According to an embodiment applying a corresponding agent for each classifier comprises applying each agent sequentially, with each agent performing a series of actions to iteratively train its corresponding classifier.

According to an embodiment the method further comprises training the agent to determine a set of actions to be performed by the agent for achieving a desired classification performance of the classification system. The training of the agent may be via reinforcement learning.

According to an embodiment there is provided a machine learning classifier trained according to the methods described herein.

According to an aspect of the invention there is provided a computer implemented method for training an agent to improve the classification performance of a classification system, the method comprising: obtaining a classifier for classifying data into one of a plurality of classes; retrieving training data comprising a set of observations and a set of corresponding labels, each label representing an assigned class for a corresponding observation; and training an agent to perform a series of actions. Each action comprises: generating labeled data from a first set of observations taken from the training data and adding the labeled data to a cumulative training set comprising the first set of observations and their corresponding labels; training the classifier using the cumulative training set; and determining a classification performance of the trained classifier. The training the agent generates a policy dictating a set of actions to be performed by the agent for achieving a desired classification performance of the classification system.

Accordingly, reinforcement learning methods may be used to train a system to train a classifier more effectively. This allows the system to learn the most appropriate action to improve the classifier's performance given the classifier's current performance. Each action comprises a step of generating labeled data and training the classifier using the labeled data. Training the agent may comprise training the agent to label data more accurately.

Classification performance may be determined based on a second set of labeled observations. The second set may be different from the first set. Alternatively, first and second sets of observations may be the same (or at least have some cross-over).

According to an embodiment the agent performs a series of actions based on a state of the classifier, generating the policy comprises storing each unique action and a value associated with each unique action, and the state of the classifier represents a level of classification performance of the classifier. Each action comprises: generating labeled data from unlabeled observations; training the classifier based on the labeled data and the training data; and determining an updated state of the classifier, the updated state representing an updated level of classification performance of the classifier following the training.

Training the agent may comprise selecting and storing in the policy the actions that provide the highest value. The value of each action may be based on a reward for that action.

According to an embodiment the policy comprises a series of state action pairs, each state representing a level of classification performance of the classifier and each action comprising: generating labeled data from unlabeled observations; training the classifier based on the labeled data and the training data; and determining an updated state of the classifier, the updated state representing an updated level of classification performance of the classifier following the training.

According to an embodiment, for at least one action, generating labeled data from the first set of observations taken from the training data comprises: applying the classifier to classify the first set of observations; for each of the first set of observations that has been classified with a confidence score that exceeds a confidence threshold, assigning a label to the unlabeled observation according to the classification.

According to an embodiment training the system comprises assigning a value to the at least one action and, based on the value, determining one or more of whether to perform this action, or a level for the confidence threshold that improves classification performance. Accordingly, the system can learn when to apply this action and what threshold to set each time the action is performed.

According to an embodiment, for at least one action, generating labeled data the first set of observations comprises: dividing each of the first set of observations into samples; determining the frequency of each sample; determining, for each sample and for each class, an inclusion probability for the sample within the class; selecting each sample that has an inclusion probability for a class that exceeds an inclusion probability threshold and assigning a label to that sample according to the class; identifying instances of each sample within the unlabeled observations; and generating labeled data from each identified instance by forming an observation comprising the identified instance and neighboring data that is located within a range of the identified instance within the unlabeled data and assigning the label corresponding to the sample for that instance to the newly formed observation.

According to an embodiment training the system comprises assigning a value to the at least one action and, determining, based on the value, one or more of whether to perform this action, a level for the inclusion probability that improves classification performance, or a level for the range over which neighboring data is selected that that improves classification performance. Accordingly, the system can learn when to apply this action and what parameters to use (e.g. range and/or inclusion probability) each time the action is performed.

The range may be a sample range (i.e. one sample to the left, one sample to the right) from the identified instance. The range may be range around the identified instance or a distance from the identified instance. More than one range may be applied (e.g. over more than one dimension and/or in more than one direction).

Training the agent may comprise applying an $\epsilon$-greedy approach to training.

According to one embodiment the classifier is one of a plurality of classifiers of an overall classification system and the method comprises, for each classifier, applying a corresponding agent to train the corresponding classifier using the policy, the policy being shared across the plurality of agents.

Training multiple agents, each assigned to a corresponding classifier improves the effectiveness of each agent at training its respective classifier. Furthermore, sharing the policy between the agents allows each agent to learn from the actions performed by previous agents. This speeds up the training of the system. Each of the classifiers may be a sub-classifier of a broader classification system. Each classifier may be a binary classifier. Accordingly, the classification system may be a multi-class classifier classifying into one of a plurality of classes, which each binary classifier relating to a single class of the plurality of classes. Each binary classifier may classify data as either belonging, or nor belonging, to its respective class.

In addition to sharing a common policy, the agents may also share training data. As each agent generates labeled data it may add this to a common set of labeled data. Each agent may add its generated labeled data to this set. Subsequent agents can therefore make use of labeled data generated by earlier agents to train their corresponding classifiers more accurately.

By making use of information learnt by previous agents (e.g. a common policy and/or generated labeled data), the later agents are able to train their classifiers with a reduced number of training iterations, as each training step will be more effective. This produces a more computationally efficient training method.

According to an embodiment the method comprises sequentially training each classifier, with each agent performing a series of actions to iteratively train its corresponding classifier with the shared policy being updated during the training of each classifier so that the highest value actions may be selected to form a trained policy.

According to an embodiment the method comprises iteratively repeating the sequential training of each classifier, based on the updated policy to iteratively improve the policy until an end condition is reached.

Each action can be considered an episode of training. An epoch may be defined as a series of actions/episodes performed by every agent. An end condition may be defined according to a maximum number of iterations of the sequential training (a maximum number of epochs) and/or according to a goal state.

According to an embodiment there is provided a reinforcement learning system trained according to any of the methods described herein.

According to an embodiment there is provided a computing system comprising a processor configured to implement any of the methods described herein.

According to an embodiment there is provided a computer readable storage medium encoded with instructions that, when executed by one or more computers, cause the one or more computers to implement any of the methods described herein.

BRIEF DESCRIPTION OF THE DRAWINGS

Arrangements of the present invention will be understood and appreciated more fully from the following detailed description, made by way of example only and taken in conjunction with drawings in which.

DETAILED DESCRIPTION

The implementations described herein apply reinforcement learning to train classifiers.

Classifiers are generally trained using supervised learning. The issue with supervised learning is that it requires labeled training data. This is usually generated manually, for instance by an expert reviewing the data and assigning labels. This can be quite an expensive and time-intensive process. The methods described herein aim to utilize reinforcement learning to learn how to generate additional instances of training data for use in training the classifiers. Once trained, the classification training system acts as an expert for automatically generating new labeled data instances from unlabeled data to train the classifier. The reinforcement learning system therefore acts as an additional (unsupervised) training layer above the supervised training of the classifier.

By utilizing the reinforcement learning methods described herein, a system can be trained to improve the classification performance of a classifier without requiring additional manually labeled data. This means that a classifier can be trained either to a higher standard using the same amount of manually labeled data as previously required, or can be trained to a similar performance using a smaller amount of input training data.

Figure 1:
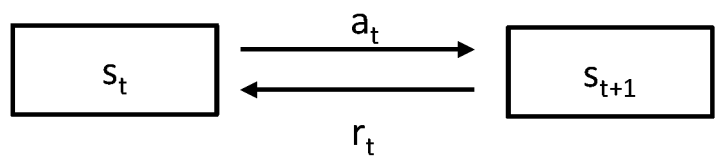
FIG. 1 shows an example of a reinforcement learning process.

FIG. 1 shows an example of a reinforcement learning process. This shows a single episode of reinforcement learning by a single agent. The agent is on an observed state $s_t$ at a particular time point t. The environment in reinforcement learning is typically considered to be a Markov Decision Process (MDP) and therefore it is fully observable. That means there is no hidden information that is taken into consideration by the learning agent.

The agent determines an action $a_t$ to be performed in response to the state $s_t$ based on a policy for the agent. The policy is a function that determines an action given an input state. The policy therefore outputs a specific action given a certain input state. In embodiments described herein, the policy maps an action to a corresponding state.

By applying the action $a_t$, the agent traverses to a new state $s_{t+1}$ in the next time point t+1. It then receives a reward $r_t$ from the environment at the state $s_{t+1}$. This whole process is called an episode. The new state $s_{t+1}$ can then be used to determine a subsequent action $a_{t+1}$ and corresponding reward. The agent may perform a sequence of actions until an end condition is reached. This end condition may be a goal state or may be a maximum number of steps. The sequence of states, actions and rewards up until the end condition reached is called an epoch.

The "quality" (i.e. value) of a reward eventually defines the state's action (through mathematical back-propagation) and therefore positive rewards are typically assigned to states which are desirable (i.e. goal states) and negative rewards are typically assigned to states which are not desirable. The agent therefore searches for the action that provides the best reward.

The agent's policy is updated based on the reward. The agent may perform a number of episodes before updating the policy, which occurs based on the rewards from the goal (i.e. final) state.

In one embodiment, whenever an agent takes an action, the action is included in the policy file, unless it is already there. The most appropriate action for a given state may be determined using a gradient ascent method based on the reward values. This involves locating values, connected to particular actions, that maximise the reward function's result.

In this way, after the end of the learning process, the agent has successfully learnt how to traverse to the most desirable state through a series of other states, by selecting the highest in value actions (i.e. those of the optimal policy).

The reinforcement learning agent learns through a series of trial-and-error episodes, being either greedy or explorative. Every time that the agent needs to take an action, given a particular state, there is a probability that it will select a random action (explorative behavior), and a probability that it will select it an action from the policy file (greedy behavior). That means it will either be greedy or explorative each time. This behavior is called e-greedy (or $\epsilon$-greedy).

The ratio between being greedy and explorative gradually decreases towards the end of the training, and the probability of being explorative eventually becomes 0 at the end. In other words, at the end of training, and after that (where the testing phase begins), the agent is 100% greedy (makes all actions based on the policy file). The sum of these two probabilities is equal to 1 (i.e. 100%) during the whole training process.

Every time an action is taken, a value for the action is determined based on the reward. The policy for the agent is then updated. The system checks whether the action $a_t$ and corresponding action value have already been stored in the policy as being associated with the state $s_t$. If so, then there is no need to store these values in the policy. If one or more of the action or action value have not been stored in the policy entry for state $s_t$ then the respective parameter is stored in the policy in an entry associated with $s_t$.

Accordingly, each unique action that is performed by the action in response to state $s_t$, and the value for that action, is recorded next to the state $s_t$ within the policy file. At the end of training, the final (optimal) policy can then be formed by determining the set of actions that provide the highest value (e.g. by selecting, for each state, the action with the highest associated value).

At the end of training, the policy (which is called optimal) should include only those actions (i.e. the optimal ones) which lead to the goal state in the most efficient way.

Reinforcement Learning for Boosting Classification Performance

The embodiments described herein utilize reinforcement learning to boost the performance of one or more classifiers. One or more reinforcement learning agents are used to generate additional training data and train the classifier(s) to improve classification performance. The agents can be trained via reinforcement learning to learn the best actions to take to train the classifiers to improve their performance. Once trained, the one or more agents can be used to train various classifiers. Accordingly, the agent(s) from part of a classification training system. Generally, a classifier assigns a set of confidence scores for a given piece of input data, each confidence score representing the confidence that the data belongs to a respective class. The methods described herein may be applied to binary classifiers (classifiers that classify data into one of two potential classes) or multiclass classifiers (classifiers that classify data into one of three or more potential classes). A multiclass classifier may be made up of a combination of multiple binary classifiers.

The methods described herein apply reinforcement learning to learn how to improve the performance of a classifier. This is based on performance metrics that provide a measure of the classification performance of the classifier relative to the ground truth classifications based on labeled (e.g. manually classified) data.

To obtain the performance metrics, the classifier is applied to a set of labeled data (data that has already been assigned a class). The classifications assigned by the classifier are compared to the ground truth classes to determine one or more classification performance metrics. The one or more classification performance metrics may represent the effectiveness or accuracy of the classifier.

The one or more classification performance metrics may comprise one or more of accuracy, recall, precision and f-score. In the embodiments described below, all of the accuracy, recall, precision and f-score are used. These metrics shall be described with reference to their application to a binary classifier. A binary classifier effectively determines whether data either belongs to a class (positive) or does not belong to the class (negative). The performance metrics provide a measure of accuracy when compared to the actual positives and negatives, as defined by the labels input in the training data.

The accuracy is the proportion of true (correct) results (both true positives and true negatives) among the total number of cases examined. The recall (or sensitivity) measures the proportion of actual positives that are correctly identified as such (the proportion of samples that are true positive results). The precision is the proportion of positive results that have been accurately classified (the proportion of positive results that are true positive results). The f-score is the harmonic average of the precision and recall.

The methods described herein take the performance metric(s) for a classifier as the input state and perform a series of actions with the aim of improving classification performance. As the performance metrics may have a variety of values, state compression is used. This converts ranges of numeric values to categorical ones. This allows the potential number of RL states to be reduced. This provides the benefits of increased speed (i.e. the RL agent learns faster) and better memory management (i.e. less memory is utilized).

In more detail, this method converts each numeric state feature to a categorical value. A predefined number of states are used. Whilst a variety of numbers of states may be used, it has been found that 7 states provide improved performance by balancing the need for accuracy against the need for computational efficiency.

Improved performance has been found by dividing the states in the following way:

Categorical value is A if the value is larger than 0.9 and less or equal than 1.
Categorical value is B if the value is larger than 0.8 and less or equal than 0.9.
Categorical value is C if the value is larger than 0.7 and less or equal than 0.8.
Categorical value is D if the value is larger than 0.6 and less or equal than 0.7.
Categorical value is E if the value is larger than 0.4 and less or equal than 0.6.
Categorical value is F if the value is larger than 0.2 and less or equal than 0.4.
Categorical value is G if the value is larger than 0.0 and less or equal than 0.2.

This number of states provides improved performance because the reinforcement learning method is capable of learning accurately how to reach the goal performance results regardless of the dataset being used. If this number was too small (e.g. 2) then reinforcement learning would not be able to distinguish between the actual (numeric) states and learn anything useful. On the other hand, if this number was too large then reinforcement learning would be computationally expensive, like dealing with the actual numeric states (their number is extremely high); although, it would be extremely accurate. The methods described herein, along with the selection of the number of categories (i.e. 7), provide fast and accurate results.

A goal state is provided. The goal state defines a desired performance for the classifier (for instance, a desired minimum value for the f-score). The agent performs a series of episodes (a series of actions) with the aim of improving performance until either the goal state is reached (i.e. a minimum classification performance is reached or surpassed) or a maximum number of episodes has been performed.

Each action may adjust a parameter utilized by the agent to synthesize additional sets of labeled data. Each action includes a step of retraining the classifier via supervised learning based, at least in part, on the newly synthesized training data. Each action performs a further classification of the original training data based on the updated classifier and outputs a new state comprising one or more new performance metrics. A reward is then assigned based on the updated state. This forms a single episode.

The reward may be assigned to a state based on the distance from the state to the goal state and the number of episodes that have been performed in the epoch (before the end criteria is met). In one embodiment, the reward function is:

$$\text{Reward} = \text{Goal\_reward} - 1000 * \text{number\_of\_episodes} - 1000 * \text{distance\_from\_goal}$$

The parameters are detailed below.

Goal_reward: This is the final reward that is used if an agent finds the goal state. In one embodiment, final reward is 15,000 if the goal state is reached. If the goal state has not been found, then this parameter's value is 0.

Number_of_episodes: This is the number of episodes that the agent has been through until the end criteria were met (i.e. either the goal state was found or the maximum number of episodes occurred). If the goal state was found, this parameter represents the number of episodes up to that point. If the maximum number of episodes occurred, then this parameter is the maximum number of episodes. In one embodiment, the maximum number of episodes is 5. That is, an agent has 5 attempts to find its goal. Having said this, other maximum limits may be utilized, depending on the scenario at hand.

Distance_from_goal: This represents "how far away" the agent's current state is from the goal state. In detail, assuming that the goal is an F-score of 0.85, if the current F-score's value is 0.5 then the distance is 0.35. Hence, the formula to calculate this parameter is: Goal_value−actual_value.

The rewards may be assigned after each episode via back-propagation. This allows the value of past actions to be updated based on the rewards from the current state/action.

At the end of each episode, an immediate reward may be provided. This may differ from the above reward as, for instance, the number of episodes is not currently known. This reward may have a predefined value. For instance, this reward's value may be 50. This is used to slightly promote the agent's effort while trying to find the goal state.

The embodiments described herein may utilize Sarsa, Sarsa($\lambda$), or any other reinforcement learning method, to learn the most effective actions for training the classifier. Policy improvement can be performed in a number of different ways, including an $\epsilon$-greedy approach with respect to action-value estimates for each action. In this case, each action may either be determined according to the policy (exploitative) or random (explorative). When performing an exploitative action, the agent chooses, from the set of actions associated in the policy with the current state, the action that has the highest stored value.

By applying reinforcement learning to train a system to improve the performance of a classifier, classification performance can be improved beyond that for conventional supervised learning. This is because the reinforcement learning method learns how to best generate additional training data and retrains the classifier accordingly. This also makes the training of the classifier more efficient as the optimal values are found without having to manually re-run the classifier.

The final trained training system can be applied to train a variety of different classifiers, provided that the classifiers perform similar classification tasks to the classifier upon which the reinforcement learning system was trained. This means that training the training system via reinforcement learning results in a training system that can train (and thereby improve performance) of other classifiers.

Whilst the methods for boosting classification performance may be applied using a single agent, it is also possible to apply these are part of a multi-agent reinforcement learning system.

Multi-Agent Reinforcement Learning (Multi-RL)

Multi-agent reinforcement learning (Multi-RL) is the use of more than one reinforcement learning agent to achieve one or more goals. In the implementations described herein, multi-RL is used to achieve a single (shared) goal. Each reinforcement learning agent works on an individual class within a multi-class classification problem. All of the agents interact with a single policy for this reason.

By sharing a single policy between multiple agents, the reinforcement learning system is able to be trained more quickly and efficiently. This is because each agent updates the shared policy after each episode. Accordingly, after one agent has finished a set of episodes, the next agent is able to utilize the knowledge stored in the policy when performing its own actions. This means that the each agent to be trained can make use of the knowledge learned by all previous agents. As the agents are all working towards a single overall classification problem, the policy can be shared and the knowledge between agents can be transferred via the shared policy.

Figure 2:
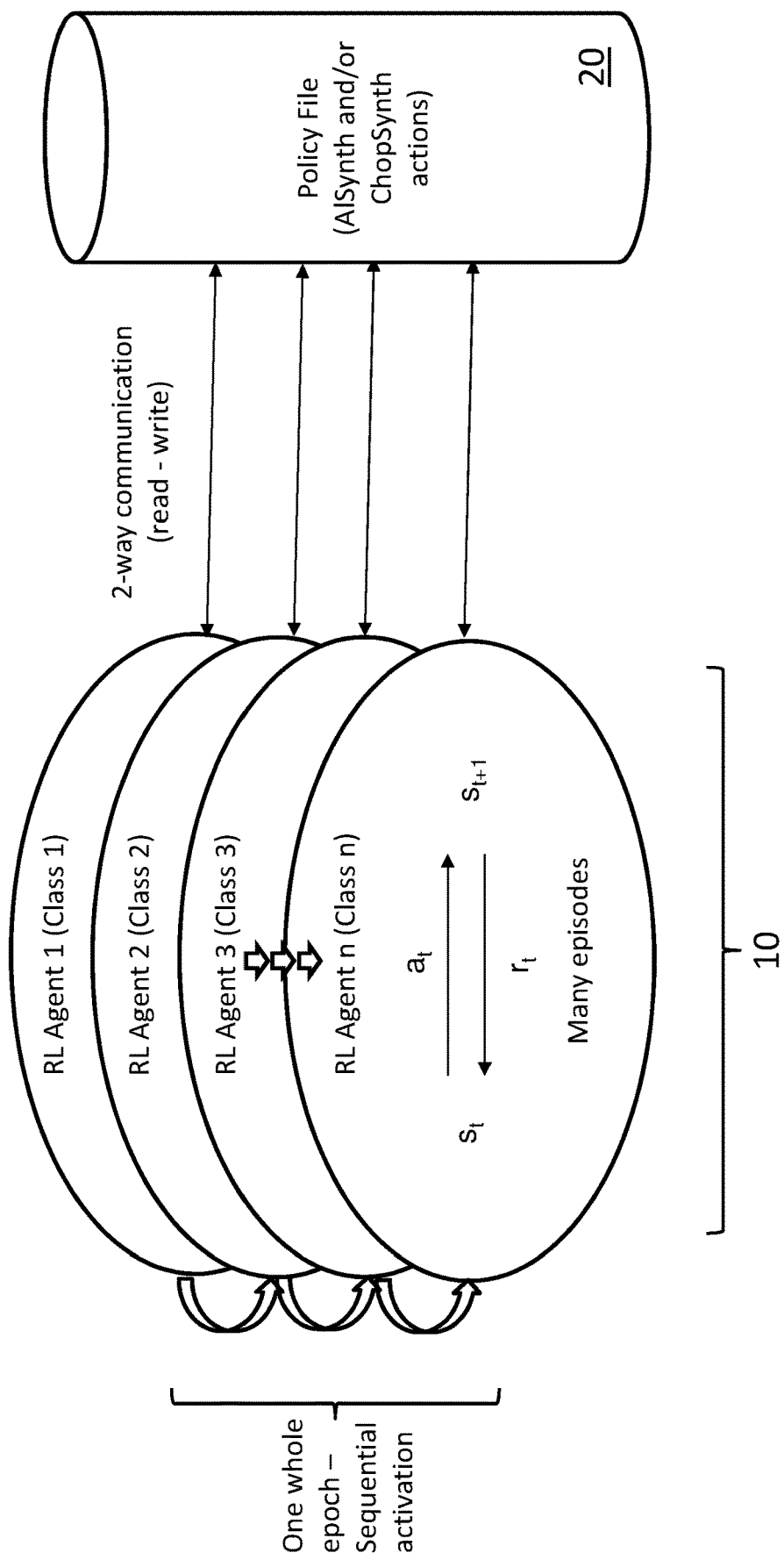
FIG. 2 shows a multi-agent reinforcement learning system according to an embodiment.

FIG. 2 shows a multi-agent reinforcement learning system according to an embodiment. This may be performed on a computing system.

A number of agents 10 interact with a single policy file 20. Each agent 10 is able to read from the policy file 20 to determine what actions to perform, and each agent 10 is able to write to the policy file 20 to update the policy file based on the training. Each agent 10 performs a number of training episodes in a round of training.

As mentioned above, an episode (or training episode) includes the phase where an agent 10 traverses from a state to a next one, through an action. It then receives a reward. In the present method, each agent 10 performs a number of training episodes, until either the goal state or the maximum number of episodes have been reached. The agents 10 are trained sequentially, one after the other, until all of their episodes are finished. That is, the agents are trained in series, with each agent performing all of its episodes before the system moves on to the next agent. This whole process is an epoch. That is, an epoch includes the full set of episodes for each agent.

The actions that the agents 10 (or runners) use can range from simple tasks, such as determining which classification threshold to use, to more complex operations, such as determining which types of classifiers to use along with their distinct parameters.

The agents 10 interact with the common policy file 20. They apply e-greedy behavior, as discussed above, to record their states and their corresponding actions to the policy 20. They also read state and action pairs from the policy 20 in order to decide about the next action to take, providing that they are being greedy (i.e. when they are not applying an explorative [i.e. random] action). During an exploitative action, the agent performs the action from the policy that has the highest action value out of the actions that have been recorded for the current state.

As multiple agents 10 are used, they converge on the goal more quickly, requiring fewer epochs than a single agent would. Furthermore, as they share the policy file 20 between them they converge on the goal faster than multiple independent agents. This is because they find records in the policy file from the previous agent(s) 10 (they can each learn from the other agents 10) and on many cases they can "resume" the work of the previous agents 10. This work involves time-consuming trial-and-error procedures (i.e. the e-greedy behavior mentioned above). The multiple agents 10 also provide better results than a single agent because they locate and work with records from the previous agents 10. Thus, they get more opportunities to find optimal actions.

As discussed above, the agents may be applied to train a number of different aspects of the system. The implementations described herein introduce new training tasks, termed AlSynth and ChopSynth.

AlSynth

AlSynth is a classification method that aims to assign labels to unlabeled data based on an initial labeled training set of data.

AlSynth operates based on a train set which consists of labeled instances (i.e. data records), and a set which consists of unlabeled instances (which may be a subset of a larger set of unlabeled data). The goal is to correctly label all of the unlabeled instances in the set based on the labeled train set, and include them in the labeled train set for re-training purposes (for retraining the classifier).

The AlSynth method can be used as a stand-alone method or as a task for one or more agents within the multi-RL methods described herein. As a stand-alone method, it requires the user to define a particular threshold value from the set: (0.0, 0.1, 0.2, 0.3, 0.4, 0.5, 0.6, 0.7, 0.8, 0.9, 1.0). This value represents the classifier's confidence score. The classifier, when classifying a particular instance, will output a confidence score according to the confidence that the instance belongs to a particular class (ranging from 0.0 representing 0% confidence, to 1.0 representing 100% confidence). Each of the instances that has a confidence score that is greater than or equal to the threshold is labeled according to the result of the classification and added to a set of labeled data. This set of labeled data may be added into the original labeled train set to provide additional data to help train the system.

Figure 3:
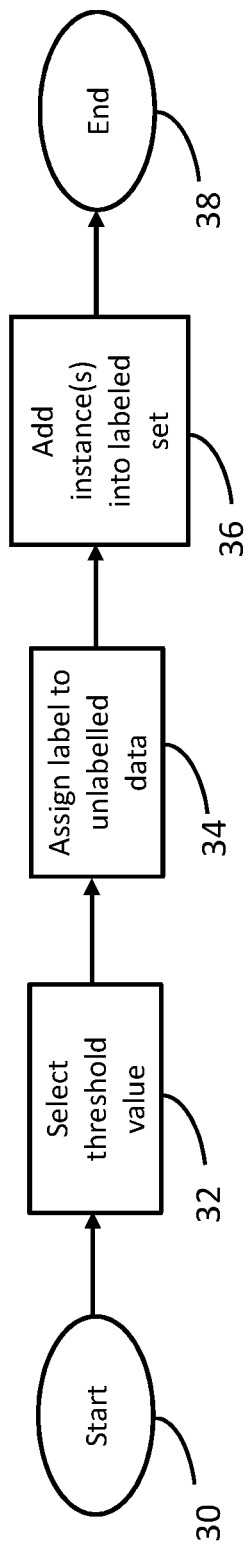
FIG. 3 shows a method of labeling unlabeled data according to an embodiment.

FIG. 3 shows a method of labeling unlabeled data according to an embodiment. The method starts 30 with the retrieval of a set of labeled data and a set of unlabeled data. A threshold value for the confidence score is then selected 32. Where this method forms a task for a reinforcement learning agent, the threshold may be assigned according to a policy for the agent.

Labels are then assigned to the unlabeled data 34 based on the confidence score output by the classifier. The classifier may be a multi-output classifier (a classifier that classifies data into one of a plurality of classes). The classifier determines the class that is most likely to apply to a given data set out of the two or more potential classes to which the classifier relates. The classifier outputs the determined class along with a confidence score representing the probability that the classification is correct. Data that is classified with a confidence score that is greater than or equal to the threshold is labeled according to the classification. Data that has a confidence score that is lower than the threshold is not labeled and remains in the set of unlabeled data. Labeling data according to classification can include storing an indication of the class of the data (e.g. in a table).

The newly labeled data is then added to the set of labeled data 36. The newly labeled data will also be removed from the set of unlabeled data. The method then ends 38.

After the newly labeled data has been generated, the newly labeled data may be used to train the classifier to improve its performance.

Due to the fact that the user does not initially know if his/her choice of threshold is correct until the unlabeled instances are labeled according to the threshold, and new classification results occur, this method can be quite time consuming when performed as an independent method. To overcome this issue, the AlSynth method can be implemented within the multi-RL methodology as described herein. Through its multiple trial-and-error processes (e-greedy) that are discussed above, efficient threshold values are located quickly, efficiently and with no human intervention.

In general, the policy for each agent may store the current threshold for each classifier. Each agent can then aim to adjust to the threshold to improve the accuracy of the classification. In this case, the task is to improve the accuracy of the classification and the action is an adjustment of the threshold and an application of the updated threshold to determine a new set of classified/labeled data and retrain the classifier based on this new set. The performance of the retrained classifier is then analyzed to determine whether the new threshold is an improvement (is more accurate). Accordingly, to train such a system, the classification can be performed on labeled data and the threshold can be adjusted to improve the accuracy of the classification (reduce the number of misclassified data points when compared to the labels assigned in the training data).

Once trained, the system can be run on unlabeled data to classify the data and add the newly classified data (newly labeled data) to the training data set. The classifier can then be trained based on the increased data set. This means that the trained system allows the classifier to be trained using fewer instances of labeled training data. The classifier can therefore be trained more quickly and efficiently. Furthermore, the system is able to be trained more effectively given the same amount of initial training data, as the amount of training data is effectively increased.

ChopSynth

ChopSynth is a method that aims to synthesize additional labeled data instances from unlabeled data to increase the amount of labeled data. Each synthesized data instance comprises a new observation that is generated from an originally unlabeled observation, along with a corresponding label. This method therefore not only assigns labels but also synthesizes new observations.

The method works by effectively "chopping" up the unlabeled data into smaller chunks to form new data instances and assigning labels to the new data instances to form new sets of labeled data. The synthesized labeled data can then be added to the set of labeled training data and used to retrain the classifier in order to improve the performance of the system. This means that the classifier can be trained using fewer instances of labeled training data, and can therefore be trained more quickly and efficiently. Furthermore, the classifier is able to be trained more effectively given the same amount of initial training data, as the amount of training data is effectively increased.

As new samples of data that are extracted from the unlabeled data and labeled, the newly labeled instances of data are of a better quality than the original data, in that they reflect their particular class more accurately. This is because ChopSynth extracts the most relevant samples from the overall dataset. As these samples are more representative of their respective classes, training classifiers based on these labeled samples is more effective relative to training on the original, broader, data instances.

ChopSynth operates in the same scenario as AlSynth with the same goal—to synthesize labeled data from unlabeled data based on labeled train data. With the ChopSynth method, frequent (but not the overly common and therefore, meaningless) features in the data are used to identify and label new features in the unlabeled data.

ChopSynth, as with the other methods described herein, can be applied to various types of data in various classification tasks. In the below embodiment, ChopSynth is described with reference to the classification of words from text data. In this scenario, the ChopSynth method uses frequent (but not the overly common and therefore, meaningless) words to identify sequences of words in the unlabeled instances. If applied to other data types such as image data, common features in the labeled set are used to identify equivalent features in the unlabeled set to generate new samples.

Figure 4:
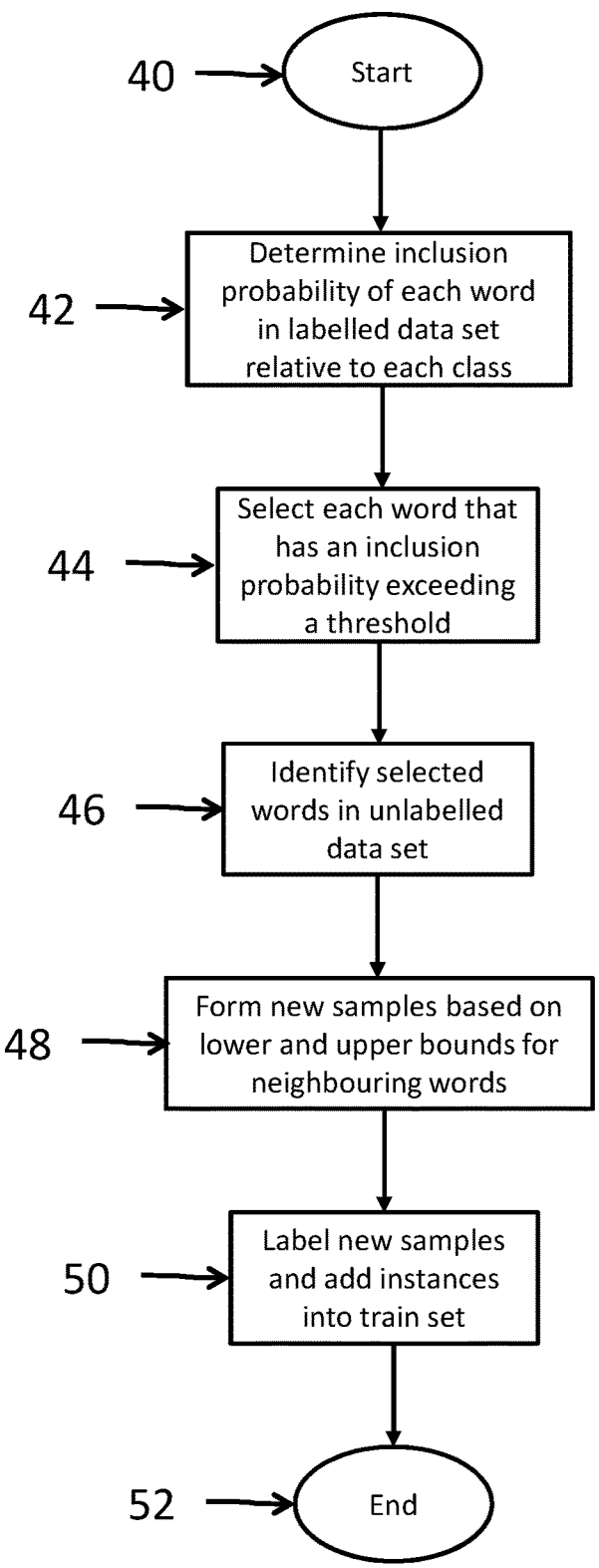
FIG. 4 shows a method for generating new instances of labeled data according to an embodiment.

FIG. 4 shows a method for generating new instances of labeled data according to an embodiment. The method starts 40 by retrieving a set of labeled data and a set of unlabeled data.

The method then determines the inclusion probability for each word in the labeled data set relative to each class 42. This is achieved by determining the overall frequency of each word in the labeled data set. The inclusion probability for each word relative to each class can then be determined based on the frequency. The inclusion probability for a given word and class represents the probability that the word will occur within any of the instances of that class. More specifically, the inclusion probability is the sum of the sample probabilities for all samples within the class that contain that word. The sample probability for a sample is the probability that the sample will contain that word. This inclusion probability applies to both the positive and negative classes of the train set.

The method then selects the words that have an inclusion probability that exceeds an inclusion probability threshold 44. This therefore identifies the words that are most representative of one of the classes.

Instances of the selected words are then identified in the unlabeled data 46. These instances are then used to form new data samples 48. The new samples are more focused instances of the data in the unlabeled data set. The new instance may simply include the identified selected word, or may include the identified selected word along with one or more neighboring words. In the latter case, upper and lower bounds are defined which represent the neighboring range around each identified term (e.g. 1 word from the left of the identified word and 2 words from the right of the identified term, 0 words from the left and 1 word from the right, etc.).

The identified word, along with any identified neighbors, is selected to form a new data sample taken from the unlabeled data.

Each sample is assigned a label and added to the training data set 50. Each sample is labeled based on the class to which the corresponding selected word is most likely to belong. That is, when a selected word has an inclusion probability that exceeds the inclusion probability threshold, the selected word is labeled with the class to which the inclusion probability relates (the class for which the word has the highest inclusion probability). This label is then assigned to each sample that is generated from the unlabeled data based on that selected word.

When all samples have been labeled and added to the train set, the method ends 52 (although, alternative or additional ending criteria may be utilized).

The new samples may be used to retrain the classifier to improve its classification performance, as mentioned above.

This method adds more focused instances (i.e. of good quality) to the original labeled train set. In this way "new" data is introduced to the set through "synthesis" by chopping up the data into smaller chunks.

When training a supervised machine learning classification system each training data point should belong to one class and only one class. Often this is not the case, and each data instance may include a data relating to a variety of different classes. For instance, a paragraph may have sequences of words that belong to different classes. The overall paragraph may therefore be a poor representation of a single one of these classes, even though the individual sentences are strongly associated with specific classes. This data point is therefore poor training data for the purposes of supervised machine learning as it confuses the training algorithm based on the multiple classes contain within it.

With ChopSynth the features that are strongly associated with specific classes (have a high inclusion probability) are identified in the labeled set. These features are then found within the unlabeled data in order to extract new data samples that are more relevant to specific classes. These data points are then labeled in accordance with the class to which their relevant feature is associated (via its inclusion probability). This therefore creates new, more specific, data points that are more strongly associated with the class to which they are labeled. The classifier can then be retrained more effectively using this improved training data.

Whilst the above method is described with reference to the analysis of text, ChopSynth may be applied to any type of data. This can include analyzing the frequency of colors, features or objects within an image. Equally, the range around the identified features can be in terms of any form of neighboring data, such as a range of neighboring pixels. More generally, labeled data sets can be divided into samples, with each sample being analyzed based on its frequency within the overall data set and the inclusion probability for each class. The samples can be filtered based on inclusion probability to select samples that have an inclusion probability that exceeds an inclusion probability threshold. Matching instances of the selected samples can be identified in the unlabeled data and new samples can be extracted from the unlabeled data and labeled according to the class to which the sample is most likely to belong. The new samples includes neighboring data that is taken from the unlabeled data set based on one or more ranges defining the boundaries around each identified matching sample. The one or more ranges may be defined along one or more corresponding dimensions within the unlabeled data.

Whilst ChopSynth can be run as a stand-alone method, the selection of the inclusion probability threshold along with the lower and upper bounds can be a time-consuming task for a user. In the multi-RL methodology described herein, this occurs automatically resulting in fast and efficient results.

In general, the policy for each agent may store the current inclusion probability threshold for each classifier and, if it is being used, the range over which neighboring samples are selected. Each agent can then aim to adjust to these parameters to improve the accuracy of the classification. In this case, the task is to improve the accuracy of the classification and the action is an adjustment of the parameters (e.g. the inclusion probability threshold or the range of neighboring data) and an application of the updated parameters to determine a new set of classified/labeled data and retrain the classifier based on this new set. The performance of the retrained classifier is then analyzed to determine whether the parameters are an improvement (result in more accurate classification). Accordingly, to train such a system, the classification can be performed on labeled data and the threshold can be adjusted to improve the accuracy of the classification (reduce the number of misclassified data points when compared to the labels assigned in the training data).

Combined Multi-RL with AlSynth and/or ChopSynth

Embodiments described herein combine the multi-RL methodology along with one or more of AlSynth and ChopSynth. Each of the agents learns how to boost classification by using the parameters of the AlSynth and/or ChopSynth that result in the desired classification performances (e.g. accuracy of 95%).

Figure 5:
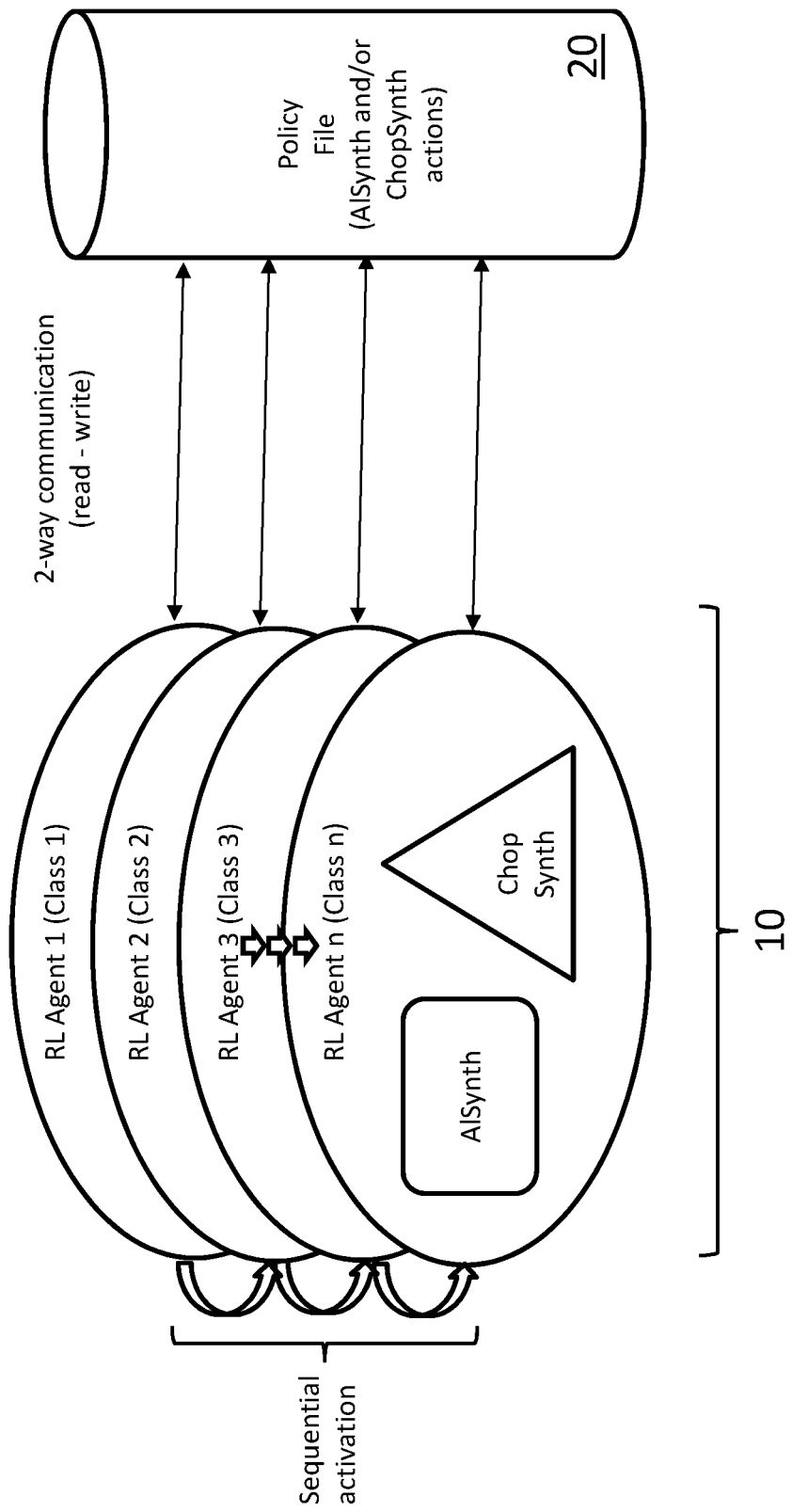
FIG. 5 shows a multi-reinforcement learning embodiment implementing AlSynth and Chopsynth methods.

FIG. 5 shows a multi-reinforcement learning embodiment implementing AlSynth and Chopsynth. This embodiment is similar to that of FIG. 2, however, each agent utilizes both AlSynth and ChopSynth.

In this case the action set includes parameters from both AlSynth and ChopSynth. Each agent is responsible for the performance of a respective binary classifier. They all interact with a shared policy file, while learning when to use each method and how (i.e. which of the parameters to use and what values).

In alternative embodiments, one or more of the agents uses one or more of the AlSynth and ChopSynth methods. The respective agent updates the parameters for the respective method (or for both, where both are utilized) to improve classification performance.

Figure 6:
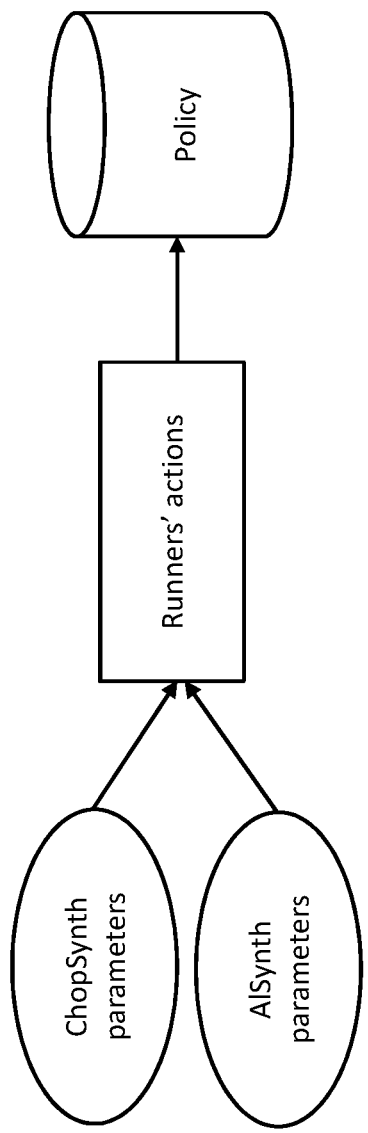
FIG. 6 shows how a runner interacts with a policy according to an embodiment.

FIG. 6 shows how a runner interacts with a policy according to an embodiment. A runner is an agent. The runner reads parameters from the policy file to determine what actions to take in response to input observed states. In this case, the runner reads AlSynth and ChopSynth parameters. The runner then determines actions based on the input states according to the policy. Using the e-greedy approach, this either includes an explorative (random) action or a greedy action according to the policy. The action updates the AlSynth and ChopSynth parameters. These updated parameters are then stored in the policy for use in future iterations of training by the runner, and for use training other runners.

Figure 7:
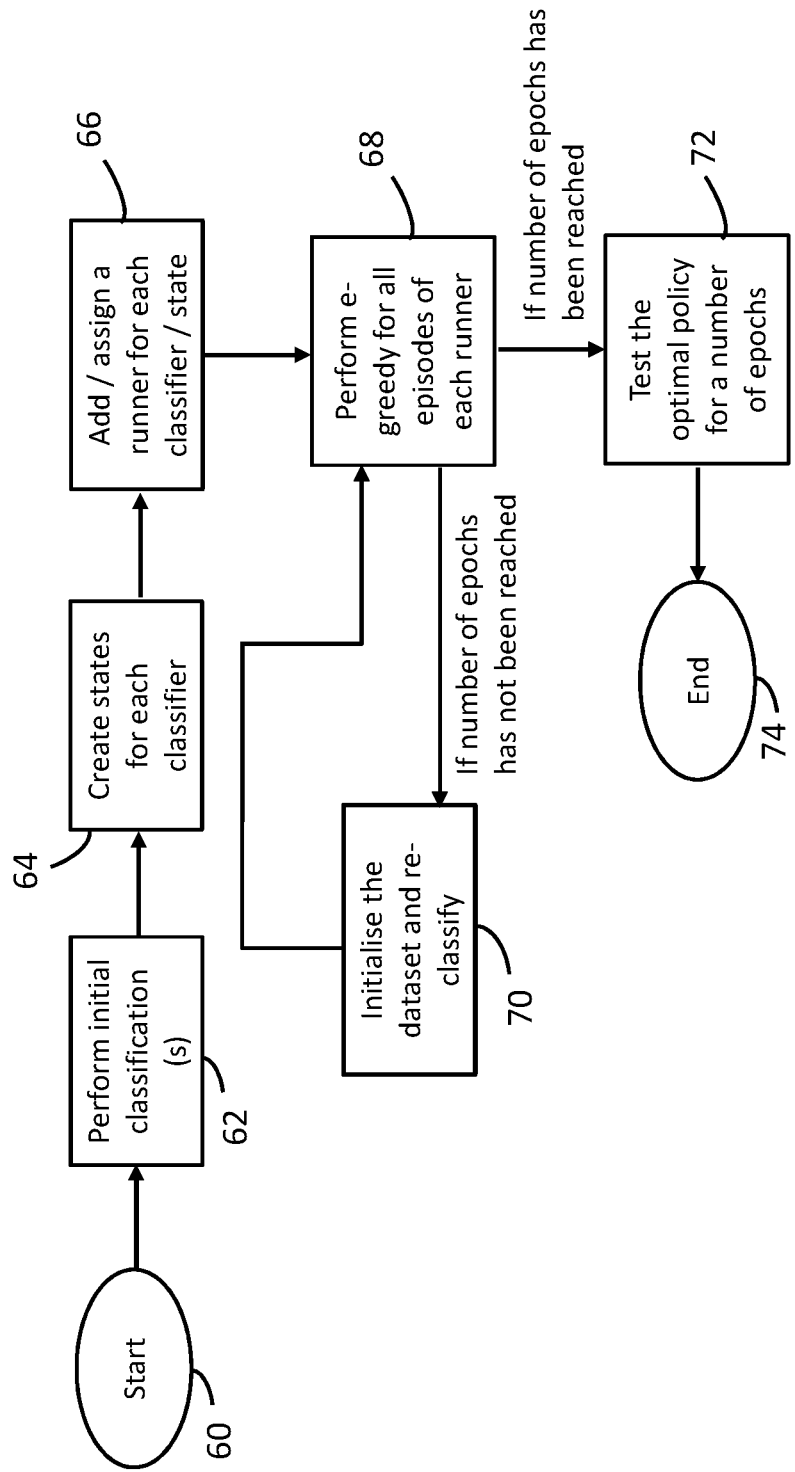
FIG. 7 shows a flow chart for training a reinforcement learning system to train a classifier according to embodiments described herein.

FIG. 7 shows a flow chart for training a reinforcement learning system to train a classifier according to embodiments described herein.

The method starts 60 with the retrieval of training data (labeled data). This may be stored locally, input via an interface or accessed via a network.

An initial round of classification is performed on the labeled data in order to determine the classification performance of the classifier. That is, a classifier is applied to each instance of labeled data 62. The classifier comprises a plurality of binary classifiers. Each binary classifier may be a one-vs.-rest classifier that either classifies the data into a given class or determines that the data does not belong to the respective class (i.e. it belongs to one of the remaining classes). The combination of multiple binary classifiers results in a multi-class classifier. Each binary classifier outputs a confidence score representing the confidence that a given input observation belongs to its respective class and a confidence score representing the confidence that the input observations does not belong to the respective class. Each binary classifier classifies initially based on an initial (e.g. default) set of parameters. The classifier (comprising the binary classifiers) may have already undergone training to train the classifier to classify the type of data being analyzed. The aim of the system is to perform reinforcement learning to train a system to learn how to further train the classifier to further improve classification performance.

Based on the classifications, a set of states for each classifier is determined 64. These states include one or more classification performance measurements (e.g. one or more of accuracy, recall, precision and F-score) for each classifier. These classification performance measurements are determined by analyzing the success of each classification relative to the ground truth classification defined by the labels assigned to training data. This training data may be the training data that is used to train the classifier, or a held out set of labeled data.

The method then assigns an agent (or runner) to each binary classifier 66. Then, each agent performs a set of training episodes to generate updated states and updates the policy according to the actions taken. Each agent chooses actions using an e-greedy approach, as described above, wherein either an explorative (random) action is taken, or an exploitative action (an action providing the highest value as defined by the policy) is taken. Each agent may perform a predetermined number of training episodes. The agents work sequentially, one after the other, so that later agents can make use of the knowledge stored in the policy by the previous agents. After an all agents have performed their set of episodes, the system determines that the training epoch has ended. Examples of epochs are shown in FIGS. 2 and 5.

If the goal state has been reached (or the maximum number of epochs has been reached) then the system moves on to testing the policy 72. If not, then the system reinitializes the data set 70 and generates a new starting state before repeating the training 68. The goal state is a desired level of classification performance.

The policy is tested 72 by applying the policy to labeled data for a number of epochs 72. This can help determine the effectiveness of the training system at improving the accuracy of the classifier. The method then ends 74.

The training system is therefore able to learn, via reinforcement learning, the best actions for retraining the classifier. Each action may include generating new instances of labeled data and retraining the classifier on these new instances. The finally trained policy can then be used to train a classifier to improve its performance. By sharing a common policy file between multiple agents, each assigned to a different binary classifier, the system is able to train the policy more quickly and efficiently.

Figure 8:
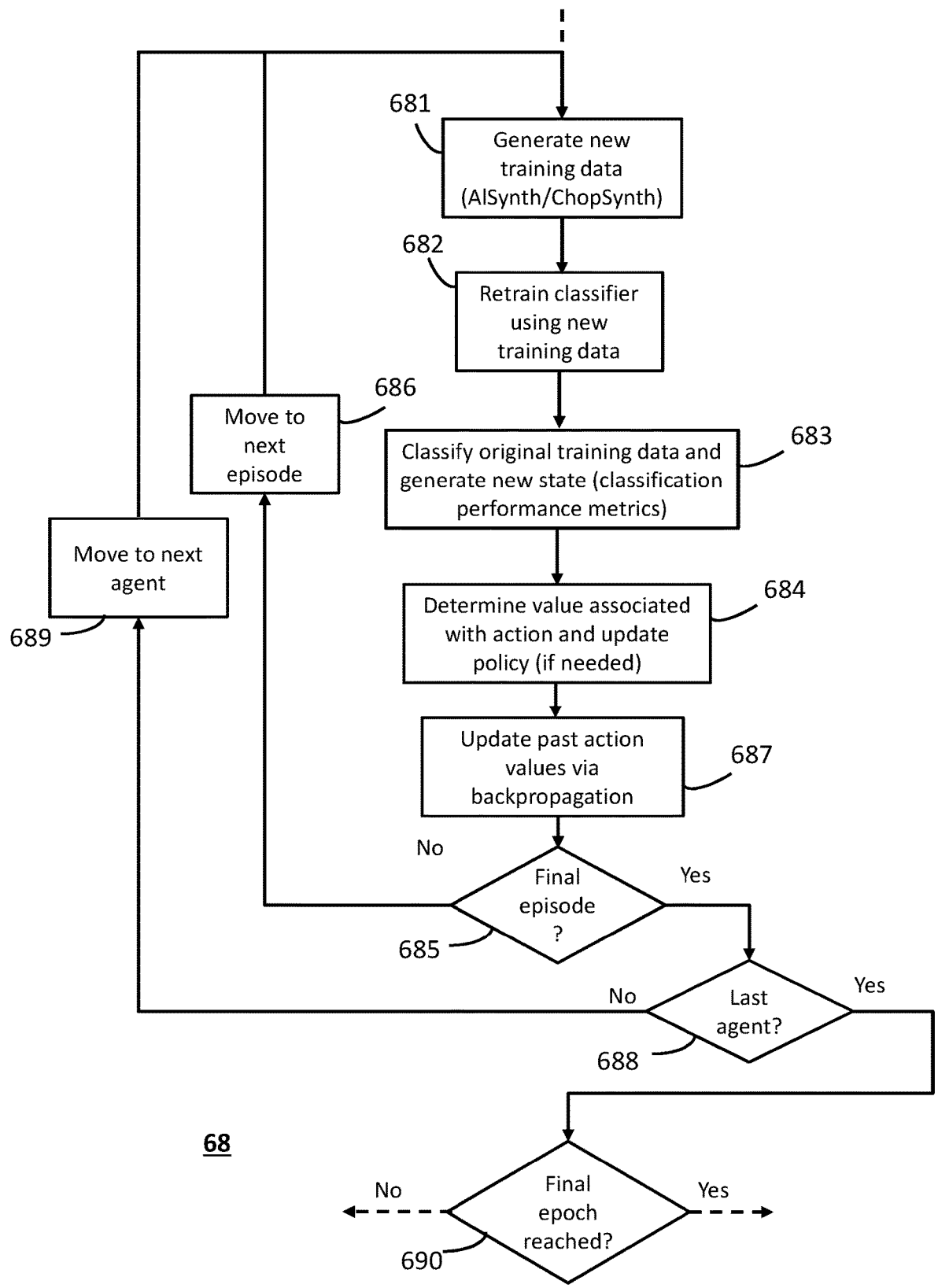
FIG. 8 shows how actions are performed by an agent according to an embodiment.

FIG. 8 shows how actions are performed by an agent according to an embodiment. This represents the steps performed in step 68 of FIG. 7.

A first agent is chosen and the initial state for the classifier corresponding to that agent is retrieved. Each classifier has its own respective state representing its classification performance. The agent then generates new labeled training data 681 using one or more of the methods described herein (e.g. ChopSynth and/or AlSynth). The method used, and the parameters used for the method, are selected by the agent based on the reinforcement learning method being applied (e.g. by the e-greedy method described herein).

The classifier is trained 682 using a supervised learning method based, at least, one the new training data. For instance, the classifier may be trained based on a combination of original training data and new training data. Furthermore, the set of training data may be built up over multiple iterations (multiple actions by the agent). The set of training data built up by each agent is shared between agents. This improves the training of the subsequent classifiers. For instance, when training data labeled according to a first class can be also used for training a second class as a negative sample (data not belonging to the second class) if the first and second classes are mutually exclusive.

The newly trained classifier is then applied to the original training data set (i.e. a labeled data set that excludes any labeled data generated by the system) to determine the classification performance 683 of the updated classifier and generate the next state for the classifier.

A reward is then generated based on the new state and used to determine a value associated with the action that has just been performed by the agent 684. The policy is updated to associate this action and action value with the previous state if this is not already reflected in the policy.

The past action values are then updated via backpropagation to take into account the most recent action value 687. This ends the episode for this agent.

It is then determined whether the final episode for the agent has been reached 685. That is, it is determined whether the goal state has been reached or whether the maximum number of episodes has been reached. If not, then the system moves to perform another episode by repeating steps 681-687 based on the most recent state. When the final episode has been performed for that agent, the method determines whether the last agent has performed all of its episodes 688. That is, the method determines if the end of the epoch has been reached, or whether there remain any agents that still need to perform their respective episodes. If more agents remain, then the system moves to the next agent 689 to repeat steps 681-685 for the next agent.

Once the last agent has run all of its training episodes, the end of the epoch has been reached and the system determines whether the final epoch has been completed 690. That is, the system determines whether the goal state has been reached and, if not, whether the maximum number of training epochs has been performed. If so, then the system moves to test the policy 72. If not, the system moves to reinitialize the dataset (e.g. the policy and the initial states) and perform another epoch of training (step 68).

Figure 9:
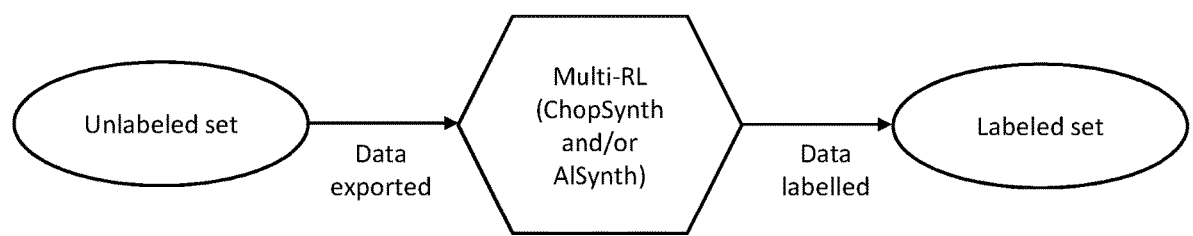
FIG. 9 shows how labeled data may be generated from unlabeled data according to embodiments described herein.

FIG. 9 shows how labeled data may be generated from unlabeled data according to embodiments described herein. As discussed, the aim of each agent is to generate labeled data from unlabeled data and to train the corresponding classifier using the newly labeled data.

A set of unlabeled data is retrieved and provided to a reinforcement learning agent. The agent then applies a set of actions to generate labeled data from the unlabeled data The action may comprise one or more of ChopSynth or AlSynth, as discussed above, or may include a different method for labeling the data. If ChopSynth is applied, then new observations are generated by taking samples from the unlabeled data and the new observations are labeled. If AlSynth is implemented then the observations in the unlabeled data are labeled.

Labeling includes labeling a piece of data with the class associated with the highest confidence score. Some data may not be assigned a label if the highest confidence score does not exceed a predefined threshold. This can help to avoid mislabeling data when there it is not clear which class should be assigned.

Whilst the embodiments of FIGS. 2 and 5 show four agents, any number of agents and classifiers may be used. Whilst the embodiment of FIG. 5 shows each agent applying AlSynth and ChopSynth, the agents need not apply both methods and only a selection of the agents may apply any of these methods. Alternatively, the multi-RL methodology described herein may be utilized without AlSynth or ChopSynth. Each agent may determine which actions to take (e.g. whether to apply AlSynth or ChopSynth) in response to certain states (certain classification performance levels).

Figure 10:
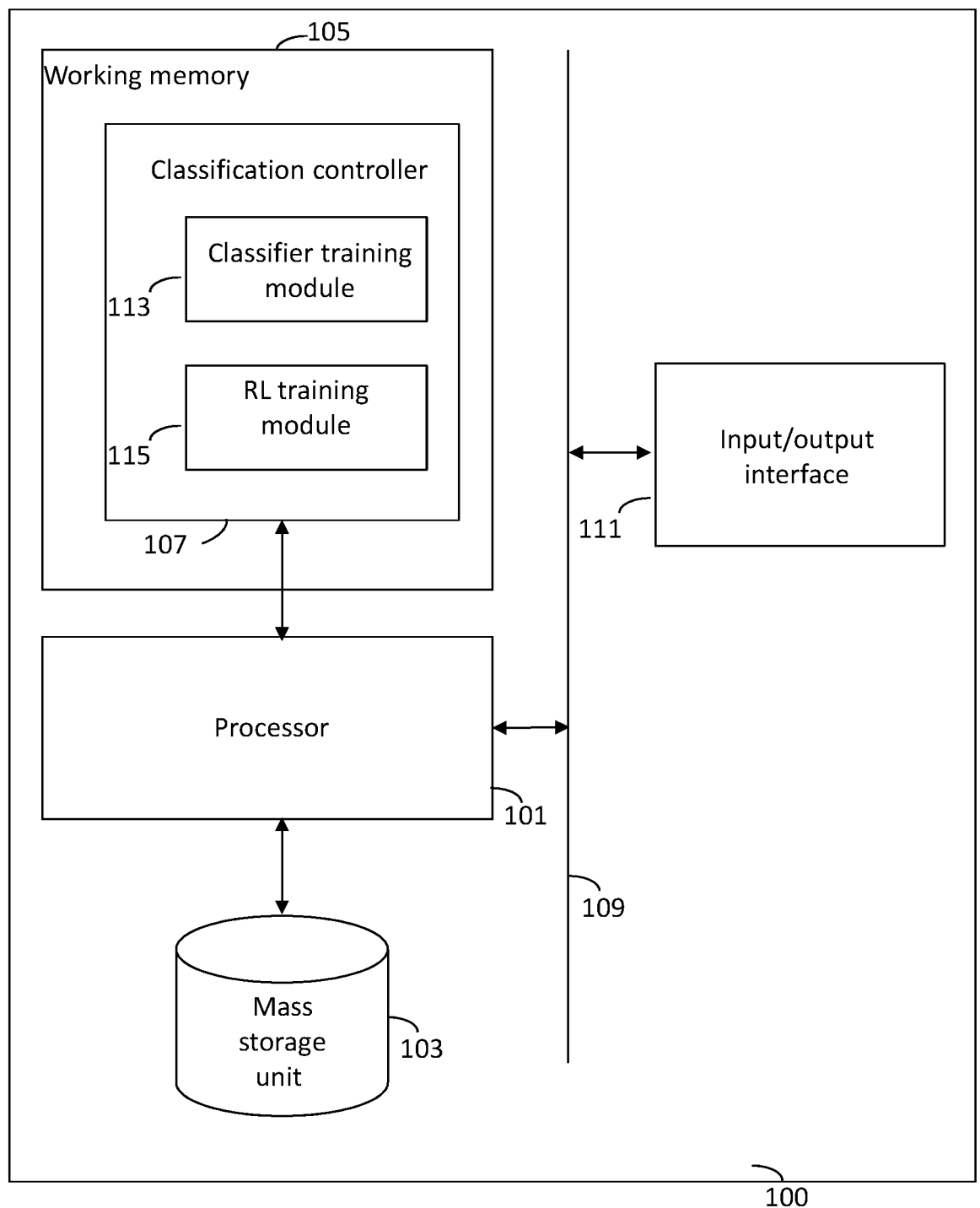
FIG. 10 shows a computing system point suitable for putting embodiments described herein into effect.

While the reader will appreciate that the above embodiments may be implemented in any computing system, a computing system point is illustrated in FIG. 10, which provides means capable of putting an embodiment, as described herein, into effect. As illustrated, the computing system 100 comprises a processor 101 coupled to a mass storage unit 103 and accessing a working memory 105. As illustrated, a classification controller 107 is represented as a software product stored in working memory 105. However, it will be appreciated that elements of the classification controller 107 may, for convenience, be stored in the mass storage unit 103.

Usual procedures for the loading of software into memory and the storage of data in the mass storage unit 103 apply. The processor 101 also accesses, via bus 109, a input/output interface 111 that is configured to receive data from and output data to an external system (e.g. an external network or a user input device). The Input/output interface 111 may be a single component or may be divided into a separate input interface and a separate output interface.

The classification controller 107 includes a classifier training module 113 and a reinforcement learning (RL) training module 115. The classifier training module 113 is operable to apply one or more agents to train one or more classifiers to classify data more effectively by implementing the actions described herein. The RL training module 115 is configured to train the agent(s) so that they can more effectively train the classifier(s). This is achieved through the reinforcement learning methods described herein. The RL training module 115 may be excluded where a pretrained policy and set of agents are is loaded onto the system and utilized by the classifier training module 113.

Execution of the classification controller software 107 by the processor 101 will cause embodiments as described herein to be implemented. When training a classifier, the classification controller 107 is configured to determine improved policy parameters for classifying data. When classifying data, the classification controller 107 is configured to label data in accordance with a specific class based on the trained policy.

The classification controller software 107 can be embedded in original equipment, or can be provided, as a whole or in part, after manufacture. For instance, the classification controller software 107 can be introduced, as a whole, as a computer program product, which may be in the form of a download, or to be introduced via a computer program storage medium, such as an optical disk. Alternatively, modifications to an existing classification controller 107 can be made by an update, or plug-in, to provide features of the above described embodiment.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The invention claimed is:

1. A computer-implemented method for training a classifier, the method comprising:
   obtaining a classifier for classifying data into one of a plurality of classes;
   retrieving training data comprising a set of observations and a set of corresponding labels, each label representing an assigned class for a corresponding observation; and
   applying an agent trained by a reinforcement learning system to generate labelled data from unlabelled observations and train the classifier using the training data and the labelled data according to a policy determined by the reinforcement learning system,
   wherein the agent performs a series of actions based on a state of the classifier, each action being determined in accordance with the policy, wherein the state of the classifier represents a level of classification performance of the classifier and each action comprises:
   generating labelled data from unlabelled observations;
   training the classifier based on the labelled data and the training data; and
   determining an updated state of the classifier, the updated state representing an updated level of classification performance of the classifier following the training,
   wherein, for at least one action, generating labelled data from unlabelled observations comprises:
   dividing each of the observations from the training data into samples;
   determining a frequency of each sample within the training data;
   determining, for each sample and for each class, an inclusion probability for the sample within the class, wherein the inclusion probability represents the probability that the sample will occur within any instance of the corresponding class;

selecting each sample that has an inclusion probability that exceeds an inclusion probability threshold and assigning an assigned label to that sample according to the class;

identifying instances of each sample within the unlabelled observations; and generating labelled data from each identified instance by forming an observation comprising the identified instance and neighbouring data that is located next to the identified instance within the unlabelled data and assigning the assigned label to that sample for that identified instance to the newly formed observation.

2. The method of claim 1 wherein the method comprises, prior to applying the agent:

applying the classifier to the observations from the training data to classify the observations; and determining a state of the classifier, the state representing the classification performance of the classifier, and wherein applying the agent comprises iteratively:

determining from the policy the action that corresponds to the state of the classifier;

performing the action to generate the updated state; and setting the state to equal the updated state, until an end condition is reached.

3. The method of claim 1 wherein, for at least one action, generating labelled data from unlabelled observations comprises:

applying the classifier to classify the unlabelled observations; and for each unlabelled observation that has been classified with a confidence score that exceeds a confidence threshold, assigning a label to the unlabelled observation according to the classification.

4. The method of claim 1 wherein the classifier is one of a plurality of classifiers of an overall classification system and the method comprises, for each classifier, applying a corresponding agent trained by the reinforcement learning system to generate labelled data from unlabelled observations and train the classifier using the training data and the labelled data according to the policy, wherein the policy is shared across the plurality of agents.

5. The method of claim 4 wherein applying a corresponding agent for each classifier comprises applying each agent sequentially, with each agent performing a series of actions to iteratively train its corresponding classifier.

6. The method of claim 1 further comprising training the agent to determine a set of actions to be performed by the agent for achieving a desired classification performance of a classification system.

7. A machine learning classifier trained according to a method comprising:

obtaining the classifier for classifying data into one of a plurality of classes;

retrieving training data comprising a set of observations and a set of corresponding labels, each label representing an assigned class for a corresponding observation; and applying an agent trained by a reinforcement learning system to generate labelled data from unlabelled observations and train the classifier using the training data and the labelled data according to a policy determined by the reinforcement learning system, wherein the agent performs a series of actions based on a state of the classifier, each action being determined in accordance with the policy, wherein the state of the classifier represents a level of classification performance of the classifier and each action comprises:

generating labelled data from unlabelled observations;

training the classifier based on the labelled data and the training data; and determining an updated state of the classifier, the updated state representing an updated level of classification performance of the classifier following the training, wherein, for at least one action, generating labelled data from unlabelled observations comprises:

dividing each of the observations from the training data into samples;

determining the frequency of each sample within the training data;

determining, for each sample and for each class, an inclusion probability for the sample within the class, wherein the inclusion probability represents the probability that the sample will occur within any instance of the corresponding class;

selecting each sample that has an inclusion probability that exceeds an inclusion probability threshold and assigning an assigned label to that sample according to the class;

identifying instances of each sample within the unlabelled observations; and generating labelled data from each identified instance by forming an observation comprising the identified instance and neighbouring data that is located next to the identified instance within the unlabelled data and assigning the assigned label to that sample for that identified instance to the newly formed observation.

8. The method of claim 7 wherein training the agent comprises assigning a value to the at least one action and, determining, based on the value, one or more of whether to perform this action, a level for the inclusion probability that improves classification performance, or a level for the range over which neighbouring data is selected that improves classification performance.

9. The method of claim 7 wherein the classifier is one of a plurality of classifiers of an overall classification system and the method comprises, for each classifier, applying a corresponding agent to train the corresponding classifier using the policy, the policy being shared across the plurality of agents.

10. The method of claim 9 wherein the method comprises sequentially training each classifier, with each agent performing a series of actions to iteratively train its corresponding classifier with the shared policy being updated during the training of each classifier so that the highest value actions may be selected to form a trained policy.

11. The method of claim 10 wherein the method comprises iteratively repeating the sequential training of each classifier, based on the updated policy to iteratively improve the policy until an end condition is reached.

12. A computing system comprising a processor configured to:

obtain a classifier for classifying data into one of a plurality of classes;

retrieve training data comprising a set of observations and a set of corresponding labels, each label representing an assigned class for a corresponding observation; and apply an agent trained by a reinforcement learning system to generate labelled data from unlabelled observations and train the classifier using the training data and the labelled data according to a policy determined by the reinforcement learning system, wherein the agent performs a series of actions based on a state of the classifier, each action being determined in accordance with the policy, wherein the state of the classifier represents a level of classification performance of the classifier and each action comprises:

generating labelled data from unlabelled observations;

training the classifier based on the labelled data and the training data; and determining an updated state of the classifier, the updated state representing an updated level of classification performance of the classifier following the training, wherein, for at least one action, generating labelled data from unlabelled observations comprises:

dividing each of the observations from the training data into samples; determining the frequency of each sample within the training data;

determining, for each sample and for each class, an inclusion probability for the sample within the class, wherein the inclusion probability represents the probability that the sample will occur within any instance of the corresponding class;

selecting each sample that has an inclusion probability that exceeds an inclusion probability threshold and assigning an assigned label to that sample according to the class;

identifying instances of each sample within the unlabelled observations; and generating labelled data from each identified instance by forming an observation comprising the identified instance and neighbouring data that is located next to the identified instance within the unlabelled data and assigning the assigned label to that sample for that identified instance to the newly formed observation.

* * * * *